UNITED STATES PATENT OFFICE.

AUGUST LEOPOLD LASKA, OF OFFENBACH-ON-THE-MAIN, AND HANS HEINRICH CHRISTIAN PRILLWITZ, OF FRANKFORT-ON-THE-MAIN, GERMANY, ASSIGNORS TO THE CORPORATION OF CHEMISCHE FABRIK GRIESHEIM-ELEKTRON, OF FRANKFORT-ON-THE-MAIN, GERMANY.

NEW MIXED PHOSPHORIC ESTERS AND PROCESSES OF MAKING SAME.

1,425,393. Specification of Letters Patent. Patented Aug. 8, 1922.

No Drawing. Application filed April 12, 1921. Serial No. 460,763.

*To all whom it may concern:*

Be it known that AUGUST LEOPOLD LASKA and HANS HEINRICH CHRISTIAN PRILLWITZ, both doctors of philosophy and citizens of Germany, with the post-office addresses Offenbach-on the-Main, Wilhelmsplatz 18, and Frankfort - on - the - Main, Danneckerstrasse 35, respectively, have invented certain new and useful Improvements in New Mixed Phosphoric Esters and Processes of Making Same; and they do hereby declare the following to be a full, clear, and exact description of the invention, such as will enable others skilled in the art to which it appertains to make and use the same.

Our invention relates to new mixed phosphoric esters of phenols of the benzene series, which are obtained by treating a mixture of phenols of the benzene series, such as phenol, ortho-, meta-, para-cresol or xylenol or higher homologues or its or their totally or partly hydrogenated derivatives, with a phosphorus compound such as phosphorus oxychloride or phosphoric anhydride according to the usual method. Advantageously mixtures are used containing at least 25-30% of a phenol containing an alkyl group in a position, other than para, relating to the oxygen-atom. Thereby either artificial mixtures can be used containing at least 25-30% ortho- or meta-cresol, or the acid oils, either totally or single fractions therefrom, which are result from the decomposition of the various tars, such as coke- or gas-works-tar, primary tar, low temperature tar, mineral- or brown-coal-generator-tar, can be used as primary products.

Homogeneous phosphoric esters, containing 3 identical molecular proportions of the same phenol united with 1 phosphoric radicle, are already known. Mixed phosphoric esters of the phenols containing various phenols in a phosphoric radicle could not be prepared hitherto and are new products being viscous, almost colourless oils of little fluorescence, liquid at ordinary temperature, which can be distilled at reduced pressure and are, when saponified, separated in phosphoric acid and mixtures of phenols. They are excellently suitable for softening agents for the production of plastic artificial bodies.

Our invention is of singular technical value, because the primary compounds for the production of the mixed esters are available in unlimited quantities, the preparation of the hitherto known liquid homogeneous phosphoric esters being possible only in limited quantities on account of the want of the cresols in question.

The production of the new compounds may be illustrated by the following examples, the parts being by weight.

Example 1.

To 500 kg. of a mixture of 60% crystallized phenol, 10% para-cresol and 30% ortho-cresol in a vessel, provided with a reflux-condenser, 221 kg. of phosphorus oxychloride are added. Then the mixture is heated to 200° until evolution of hydrogen chloride ceases. The product, thus obtained, is diluted with benzene and washed at first with caustic soda lye, then with water until the reaction is neutral. After distilling the benzene off the mixed ester formed is obtained, which can be rectified by distilling in vacuo.

Eample 2.

500 kg. of a mixture of 10% crystallized phenol, 60% para-cresol and 30% ortho-cresol are treated with 221 kg. of phosphorus oxychloride and worked up, as described in Example 1.

Example 3.

500 kg. of a mixture of 50% crystallized phenol, 20% para-cresol and 30% meta-cresol are treated with 221 kg. of phosphorus oxychloride in the same manner.

Example 4.

500 kg. of a mixture of 25% crystallized phenol, 25% para-cresol, 20% xylenol and 30% ortho-cresol are treated with 221 kg. of phosphorus oxychloride and worked up.

Example 5.

108 parts of each ortho-cresol, meta-cresol and para-cresol are melted together, the melting mass is poured into 160 parts of phosphorus oxychloride and the mixture is heated at first for some hours to a moderate, then to a higher temperature, at least up to 300°, until the development of hydrochloric acid is finished. The raw product is treated with diluted caustic soda lye and then subjected to a fractional distillation at reduced pressure. As chief fraction a water-clear viscous oil of little fluorescence is obtained at 302–304° and 41 mm. pressure.

Example 6.

500 kg. of raw carbolic acid, obtained from coke-tar, are heated with 221 kg. of phosphorus oxychloride at about 200°, until evolution of hydrogen chloride ceases. The product of reaction, thus obtained, is diluted with benzene after cooling down and washed at first with caustic soda lye and then with water until it shows neutral reaction. After distilling off the benzene the mixed ester formed is obtained, which can be used without ado and eventually can be purified by distillation in vacuo.

Example 7.

750 kg. of the raw cresols, isolated from gas-works-tar, are treated in a vessel, provided with a reflux-condenser, slowly with 332 kg. of phosphorus oxychloride. The mixture is heated to 200°, until the evolution of hydrogen chloride ceases. The product of reaction, thus obtained, is worked up in the manner, described in Example 6.

Example 8.

500 kg. of the acid oils, obtained from primary tar (low temperature tar) or brown-coal-tar, are esterified together to 21 kg. of phosphorus oxychloride in a vessel, provided with a reflux-condenser, and worked up like in Example 6.

Now what we claim and desire to secure by Letters Patent is the following:

1. As new products mixed phosphoric esters of phenols of the benzene series, which are, when saponified, separated into phosphoric acid on the one side and into mixtures of phenols of the benzene series on the other side, being viscous, almost colourless oils of little fluorescence, liquid at ordinary temperature, which can be distilled at reduced pressure.

2. A process of making mixed phosphoric esters of phenols of the benzene series, which consists in treating a mixture of phenols of the benzene series with a phosphorus compound according to the usual method.

3. A process of making mixed phosphoric esters of phenols of the benzene series, which consists in treating a mixture of phenols of the benzene series with phosphorus oxychloride according to the usual method.

4. As new products mixed phosphoric esters of phenols of the benzene series, which are, when saponified separated in phosphoric acid and mixtures of phenols of the benzene series containing at least 25–30% of a phenol, containing an alkyl group in a position, other than para-, relating to the oxygen-atom, the mixed phosphoric esters being viscous, almost colourless oils of little fluorescence, liquid at ordinary temperature, which can be distilled at reduced pressure.

5. A process of making mixed phosphoric esters of phenols of the beneze series, which consists in treating a mixture of phenols of the benzene series containing at least 25–30% of a phenol containing an alkyl group in a position, other than para, relating to the oxygen-atom, with a phosphorus compound according to the usual method.

6. A process of making mixed phosphoric esters of phenols of the benzene series, which consists in treating a mixture of phenols of the benzene series containing at least 25–30% of a phenol containing an alkyl group in a position, other than para, relating to the oxygen-atom, with phosphorus oxychloride according to the usual method.

7. As new products mixed phosphoric esters of phenols of the benzene series which are, when saponified, separated in phosphoric acid and mixtures of phenols of the benzene series containing at least 25–30% of a phenol, containing a methyl group in a position, other than para, relating to the oxygen-atom, the mixed phosphoric esters being viscous, almost colourless oils of little fluorescence, liquid at ordinary temperature, which can be distilled at reduced pressure.

8. A process of making mixed phosphoric esters of phenols of the benzene series, which consists in treating a mixture of phenols of the benzene series containing at least 25–30% of a phenol containing a methyl group in a position, other than para, relating to the oxygen-atom, with a phosphorus compound according to the usual method.

9. A process of making mixed phosphoric esters of phenols of the benzene series, which consists in treating a mixture of phenols of the benzene series containing at least 25–30% of a phenol containing a methyl group in a position, other than para, relating to the oxygen-atom, with phosphorus oxychloride according to the usual method.

10. A process of making mixed phosphoric esters of phenols of the benzene series, which consists in treating a mixture of phenols of the benzene series, represented by the acid oils resulting by decomposing the tars, with a phosphorus compound according to the usual method.

11. A process of making mixed phosphoric esters of phenols of the benzene series, which consists in treating a mixture of phenols of the benzene series represented by the acid oils resulting by decomposing the tars with phosphorus oxychloride according to the usual method.

In testimony whereof we affix our signatures.

AUGUST LEOPOLD LASKA.
HANS HEINRICH CHRISTIAN PRILLWITZ.